Patented Mar. 12, 1940

2,193,614

UNITED STATES PATENT OFFICE 2,193,614

PLASTICIZER

Claude H. Alexander, Cuyahoga Falls, Ohio, assignor to The B. F. Goodrich Company, New York, N. Y., a corporation of New York No Drawing. Application September 1, 1937
Serial No. 161,961

5 Claims. (Cl. 260—36)

This invention relates to plasticizers and to plastic compositions containing them, and has as its principal object to provide plasticizers which improve the dielectric and solvent-resisting properties of the compositions in which they are used.

Plastic compositions frequently require plasticizers to render them less brittle and more easily workable. Plasticizers are also used in lacquers and paints containing plastics to impart the desired flexibility to films formed therefrom. The plasticizers of my invention are particularly useful in the polyvinyl halide compositions described in U. S. Patent No. 1,929,453 issued to Waldo L. Semon for their incorporation therein produces a remarkable improvement in the properties of the compositions.

It is well known that as a class aromatic oxygen ethers are good plasticizers. Many of these compounds, however, are solids, which property is undesirable in a plasticizer. Diphenylether, for instance, melts at 28° C. and compositions plasticized therewith are stiff and boardy even at ordinary room temperatures. To obviate this difficulty, the ethers may be nitrated to form, for example, ortho-nitro-diphenylether which has a freezing point below minus 40° C. Compositions plasticized with nitrated compounds, however, have such poor dielectric properties that they are practically useless as protective insulating coatings on electroplating racks, cables, and other conductors.

I have discovered that the members of the class of compounds having the structural formula $R_1$—O—$R_2$ wherein $R_1$ represents an aryl group containing two directly connected rings such as a naphthyl or xenyl group and $R_2$ represents an aliphatic or alicyclic group containing not more than six carbon atoms are excellent plasticizers which impart improved electrical and acid-resistant properties to compositions in which they are used. Typical members of this class include methyl alpha-naphthyl ether, ethyl beta-naphthyl ether, propyl ortho-xenyl ether, isopropyl meta-xenyl ether, amyl beta-naphthyl ether, cyclohexyl ortho-xenyl ether, amyl meta-xenyl ether, tert amyl ortho-xenyl ether, 3 chloro, 3' butoxy biphenyl, 3 methoxy, 3' butoxy-biphenyl, 2 chloro, 2' amyloxybiphenyl, 3 chloro, 3' cyclohexoxybiphenyl, etc. These compounds are selected merely for illustrative purposes, and others within the class defined in this invention are equally satisfactory plasticizers. Compounds wherein $R_2$ contains more than six carbon atoms are as a rule unsatisfactory plasticizers because of the relative insolubility of polyvinyl halides therein. Although compounds containing para substituted xenyl groups fall within the broad scope of this invention, the compounds containing meta or ortho substituted xenyl groups are usually better plasticizers. As a class, the ethers wherein $R_1$ is a phenyl group are too volatile to be satisfactory plasticizers.

The plasticizers may be incorporated in the composition by any of the well-known methods. The polyvinyl halide may be dissolved in the plasticizer at elevated temperatures. For instance, gamma polyvinyl chloride may be dissolved in an equal weight of amyl beta-naphthyl ether at about 125° C. The plasticizer may also be added to the composition on a heated roll-mill, or the mixing may be done in an internal mixer. I usually combine from one-half to four parts by weight of plasticizer with one part of polyvinyl halide, though in some instances greater or less amounts may be used.

Carbon black, clay, barytes, zinc oxide, wood flour, and other pigments and fillers commonly used in the rubber and plastics industries may be included in the compositions.

Of the ordinary commercial plasticizers I have tested, tricresyl phosphate imparts to polyvinyl halide compositions the best dielectric properties. To illustrate the superiority of the plasticizers of this invention, I will show the results obtained from electrical tests on compositions containing tricresyl phosphate and three of the plasticizers of this invention.

| Composition | A | B | C | D |
|---|---|---|---|---|
| Gamma polyvinyl chloride | 57.2 | 57.2 | 57.2 | 57.2 |
| Tricresyl phosphate | 42.8 | | | |
| Amyl beta-naphthyl ether | | 42.8 | | |
| Amyl 2-xenyl ether | | | 42.8 | |
| 2 chloro, 2' amyloxybiphenyl | | | | 42.8 |

| | Power factor (percent) at 1000 cycles | | | | |
|---|---|---|---|---|---|
| Temperature | 30 | 40 | 50 | 60 | 70 |
| Composition: | | | | | |
| A | 14.3 | 13.4 | 10.4 | 13.4 | 17.1 |
| B | 6.8 | 5.8 | 7.9 | 13.0 | |
| C | 6.2 | 3.8 | 3.4 | 5.5 | 9.0 |
| D | 7.8 | 5.5 | 5.7 | 8.5 | 12.7 |

It is obvious from the results of these tests that the dielectric properties of these compositions are greatly improved by the use of the plasticizers of this invention. I have also found that compositions containing these plasticizers have greater resistance to concentrated oxidizing acids than similar compositions containing ordinary plasticizers such as tricresyl phosphate, o-nitrodiphenylether, dibutyl phthalate, etc.

Although I have herein disclosed specific embodiments of my invention, I do not limit myself wholly thereto, for many modifications such as the substitution of equivalent materials and the variation of proportions used are within the spirit and scope of the invention as defined in the appended claims.

I claim:

1. A plasticized composition comprising gamma polyvinyl chloride and a compound having the structural formula $R_1$—O—$R_2$ wherein $R_1$ represents a member of the class consisting of naphthyl and xenyl groups and $R_2$ represents a member of the class consisting of aliphatic or alicyclic groups containing not more than six carbon atoms.

2. A plasticized composition comprising gamma polyvinyl chloride and amyl beta-naphthyl ether.

3. A plasticized composition comprising gamma polyvinyl chloride and amyl meta-xenyl ether.

4. A plasticized composition comprising gamma polyvinyl chloride and 2 chloro, 2' amyloxybiphenyl.

5. A plasticized composition comprising gamma polyvinyl chloride, and from one-half to four parts by weight based on the gamma polyvinyl chloride of a compound having the structural formula $R_1$—O—$R_2$ wherein $R_1$ represents a member of the class consisting of naphthyl and xenyl groups and $R_2$ represents a member of the class consisting of aliphatic and alicyclic groups containing not more than six carbon atoms.

CLAUDE H. ALEXANDER.